(12) United States Patent
Kincaid et al.

(10) Patent No.: US 12,217,560 B2
(45) Date of Patent: *Feb. 4, 2025

(54) ULTRA-WIDEBAND TECHNOLOGIES FOR SEAMLESS ACCESS CONTROL

(71) Applicant: Schlage Lock Company LLC, Carmel, IN (US)

(72) Inventors: Ryan C. Kincaid, Indianapolis, IN (US); Robert Prostko, Carmel, IN (US); Robert Martens, Carmel, IN (US); Benjamin J. Hopkins, Zionsville, IN (US); David M. Baty, Indianapolis, IN (US); Srikanth Venkateswaran, Carmel, IN (US); Christopher R. Baker, Fishers, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/203,386

(22) Filed: May 30, 2023

(65) Prior Publication Data
US 2024/0104983 A1    Mar. 28, 2024

Related U.S. Application Data

(63) Continuation of application No. 17/105,737, filed on Nov. 27, 2020, now Pat. No. 11,663,864.
(Continued)

(51) Int. Cl.
*G08B 21/00*    (2006.01)
*G07C 9/00*    (2020.01)
(Continued)

(52) U.S. Cl.
CPC ........ *G07C 9/00182* (2013.01); *H04W 4/021* (2013.01); *H04W 52/0229* (2013.01); *H04W 76/14* (2018.02)

(58) Field of Classification Search
CPC ...... G07C 9/00182; G07C 2009/00793; G07C 9/00309; G07C 9/28; G07C 2209/63;
(Continued)

(56) References Cited

U.S. PATENT DOCUMENTS 6,720,861 B1    4/2004    Rodenbeck et al.
8,319,605 B2    11/2012   Hassan et al.
(Continued)

FOREIGN PATENT DOCUMENTS

CN    102906360 A    1/2013
CN    107945316 A    4/2018
(Continued)

OTHER PUBLICATIONS

Shikiar, A. et al., The Future of Authentication for the Internet of Things, FIDO Alliance, Mar. 28, 2017, https://fidoalliance.org/wpcontenVuploads/The_Future_of_Authentication_for_IoT_Webinar_170328_v10.pdf, 56 pages.
(Continued)

*Primary Examiner* — Mark S Rushing
(74) *Attorney, Agent, or Firm* — Taft Stettinius & Hollister LLP (57) ABSTRACT

A system according to one embodiment includes a first computing device comprising ultra-wideband communication circuitry, and a second computing device comprising ultra-wideband communication circuitry configured to communicate with the ultra-wideband communication circuitry of the first computing device to determine the angle and distance of the first computing device relative to the second computing device.

20 Claims, 2 Drawing Sheets

Related U.S. Application Data (60) Provisional application No. 62/940,997, filed on Nov. 27, 2019.

(51) Int. Cl.
  *H04W 4/021* (2018.01)
  *H04W 52/02* (2009.01)
  *H04W 76/14* (2018.01)

(58) Field of Classification Search
  CPC . H04W 4/021; H04W 52/0229; H04W 76/14; H04W 4/33; H04W 12/06; H04W 4/023; H04W 4/80; H04W 12/63; H04W 8/005; H04W 84/18; H04W 76/27; H04W 88/06; G01S 5/0289; G01S 5/12; Y02D 30/70
  USPC ........................................................ 340/5.31
  See application file for complete search history.

(56) References Cited

U.S. PATENT DOCUMENTS

| | | |
|---|---|---|
| 9,196,104 B2 | 11/2015 | Dumas et al. |
| 9,218,696 B2 | 12/2015 | Dumas et al. |
| 9,336,637 B2 | 5/2016 | Neil et al. |
| 9,378,598 B2 | 6/2016 | Dumas et al. |
| 9,512,643 B1 | 12/2016 | Keefe |
| 9,970,229 B1 | 5/2018 | Favila et al. |
| 10,453,281 B1 | 10/2019 | Lopez et al. |
| 10,619,380 B2 | 4/2020 | Ahearn et al. |
| 10,719,999 B2 | 7/2020 | Love et al. |
| 10,759,389 B2 | 9/2020 | Ledvina et al. |
| 10,760,332 B2 | 9/2020 | Kincaid et al. |
| 11,562,609 B2 | 1/2023 | Prostko et al. |
| 11,663,864 B2 | 5/2023 | Kincaid et al. |
| 2002/0067259 A1 | 6/2002 | Fufidio et al. |
| 2005/0046546 A1 | 3/2005 | Masudava |
| 2006/0164208 A1 | 7/2006 | Schaffzin et al. |
| 2009/0002246 A1 | 1/2009 | Rabinovich et al. |
| 2010/0201482 A1* | 8/2010 | Robertson .......... G07C 9/00904 340/5.61 |
| 2012/0032850 A1 | 2/2012 | Nakagawa et al. |
| 2012/0234058 A1 | 9/2012 | Neil et al. |
| 2013/0176107 A1 | 7/2013 | Dumas et al. |
| 2013/0237179 A1* | 9/2013 | Potineni ................ H04W 4/024 455/404.2 |
| 2013/0237193 A1 | 9/2013 | Dumas et al. |
| 2013/0241694 A1 | 9/2013 | Sharma et al. |
| 2014/0148196 A1 | 5/2014 | Bassan-Eskenazi et al. |
| 2014/0292481 A1 | 10/2014 | Dumas et al. |
| 2015/0121465 A1 | 4/2015 | Berns et al. |
| 2015/0213663 A1 | 7/2015 | Dumas et al. |
| 2015/0309487 A1 | 10/2015 | Lyman |
| 2016/0055692 A1 | 2/2016 | Trani |
| 2016/0086400 A1 | 3/2016 | Dumas et al. |
| 2016/0180620 A1 | 6/2016 | Eyring et al. |
| 2016/0189453 A1 | 6/2016 | Johnson et al. |
| 2016/0217638 A1* | 7/2016 | Child .................. H04L 12/2827 |
| 2016/0227362 A1 | 8/2016 | Howard et al. |
| 2016/0307385 A1 | 10/2016 | Arfwedson et al. |
| 2016/0332598 A1* | 11/2016 | Ghabra .................. B60R 25/30 |
| 2016/0337863 A1 | 11/2016 | Robinson et al. |
| 2016/0350992 A1 | 12/2016 | Telljohann et al. |
| 2017/0303090 A1 | 10/2017 | Stitt et al. |
| 2017/0323093 A1 | 11/2017 | Liu et al. |
| 2017/0372542 A1 | 12/2017 | Romero et al. |
| 2018/0052217 A1 | 2/2018 | Jonsson |
| 2018/0056939 A1* | 3/2018 | van Roermund ....... B60R 25/04 |
| 2018/0102008 A1 | 4/2018 | Dupart et al. |
| 2018/0162321 A1* | 6/2018 | Spiess ................ G07C 9/00309 |
| 2018/0242105 A1 | 8/2018 | Sute |
| 2018/0315262 A1* | 11/2018 | Love .................. G07C 9/00309 |
| 2019/0135229 A1 | 5/2019 | Ledvina et al. |
| 2019/0232733 A1 | 8/2019 | Patel et al. |
| 2020/0168017 A1 | 5/2020 | Prostko et al. |
| 2020/0314651 A1 | 10/2020 | Pirch et al. |
| 2021/0158637 A1 | 5/2021 | Kincaid et al. |
| 2021/0325188 A1* | 10/2021 | Nanda ..................... G06F 16/29 |
| 2023/0010267 A1 | 1/2023 | Kincaid et al. |
| 2023/0213637 A1 | 7/2023 | Brown et al. |

FOREIGN PATENT DOCUMENTS

| | | |
|---|---|---|
| EP | 2930071 A1 | 10/2015 |
| JP | 2019528387 A | 10/2019 |
| WO | 2014155255 A1 | 10/2014 |
| WO | 2016177666 A1 | 11/2016 |
| WO | 2017180563 A1 | 10/2017 |
| WO | 2017180688 A1 | 10/2017 |
| WO | 2018071671 A2 | 4/2018 |
| WO | 2020083750 A1 | 4/2020 |
| WO | 2020193566 A1 | 10/2020 |

OTHER PUBLICATIONS

Developing Beacons with Bluetooth Low Energy (BLE) Technology; Silicon Laboratories; http://www.silabs.com/products/wireless/bluetooth/developing-beacons-with-bluetooth-low-energy-ble-technology; (last visited Apr. 27, 2017).

Angle of arrival; Wikipedia; https://en.wikipedia.org/wiki/Angle_of_arrival; (last visited Apr. 27, 2017).

What do you want to track? Whatever you want to track, Quuppa brings you the dot on the map.; Quuppa—Do More With Location; http://quuppa.com/; (last visited Apr. 27, 2017).

Indoor Location Positioning Technology: Research, Solutions & Trends; Grizzly Analytics; http://www.grizzlyanalytics.com/report_2015_02_indoor.html; (last visited Apr. 27, 2017).

Front Page—Car Connectivity Consortium; Car Connectivity Consortium; retrieved on Jan. 13, 2021; https://carconnectivity.org/; 6 pages.

Volkswagen and NXP Show First Car Using UWB to Combat Relay Theft; EE Times; retrieved on Jan. 13, 2021; https://www.eetimes.com/volkswagen-and-nxp-show-first-car-using-uwb-to-combat-relay-theft/; 4 pages.

Car thefts up 49% in five years following advent of keyless-entry technology; The Sunday Times Driving; retrieved on Jan. 13, 2021; https://www.driving.co.uk/news/many-cars-sale-today-risk-keyless-theft-new-research-finds/; 6 pages.

Front Page—UWB Alliance; UWB Alliance; retrieved on Jan. 13, 2021; https://uwballiance.org/; 11 pages.

Alliance Rallies UWB for Location Services; EE Times; retrieved on Jan. 13, 2021; https://www.eetimes.com/alliance-rallies-uwb-for-location-services/; 2 pages.

UWB Alliance to focus on interoperability, further boosting the UWB ecosystem; FierceWireless; retrieved on Jan. 13, 2021; https://www.fiercewireless.com/wireless/uwb-alliance-to-focus-interoperability-further-boosting-uwb-ecosystem; 4 pages.

Front Page—FiRa Consortium; FiRa Consortium; retrieved on Jan. 13, 2021; https://www.firaconsortium.org/; 3 pages.

Introduction to the FiRa Consortium; FiRa Consortium; Aug. 1, 2019; 17 pages.

Ultra-Wideband (UWB) Gains Traction as a Sensing Technology Under New Industry Consortium; Forbes; retrieved on Jan. 13, 2021; https://www.forbes.com/...01/ultra-wideband-uwb-gains-traction-as-a-sensing-technology-under-new-industry-consortium/?sh=62102d366e21; 6 pages.

The Biggest iPhone News Is a Tiny New Chip Inside It; Wired; retrieved on Jan. 13, 2021; https://www.wired.com/story/apple-u1-chip/; 5 pages.

Apple built UWB into the iPhone 11. Here's what you need to know (FAQ); cnet; retrieved on Jan. 13, 2021; https://www.cnet.com/news/apple-built-uwb-into-the-iphone-11-heres-what-you-need-to-know-faq/; 6 pages.

Ultra-Wideband (UWB); NXP; retrieved on Jan. 13, 2021; https://www.nxp.com/applications/enabling-technologies/connectivity/ultra-wideband-uwb:UWB; 7 pages.

NXP Introduces Higher Security Using Ultra-Wideband Technology; Forbes; https://www.forbes.com/sites/tiriasresearch/2019/06/

(56) References Cited

OTHER PUBLICATIONS

26/nxp-introduces-higher-security-using-ultra-wideband-technology/?sh=dc7565238410retrieved on Jan. 13, 2021; 5 pages.
Front Page—Decawave; Decawave; retrieved on Jan. 13, 2021; https://www.decawave.com/; 5 pages.
New Zealand Examination Report; New Zealand Intellectual Property Office; New Zealand Patent Application No. 789820; Jan. 11, 2024; 6 pages.
Australian Examination Report; IP Australia; Australia Patent Application No. 2020391236; Jul. 3, 2023; 4 pages.
New Zealand Examination Report; New Zealand Intellectual Property Office; New Zealand Patent Application No. 789820; Feb. 12, 2024; 4 pages.
Extended European Search Report, European Patent Office, European Patent Application No. 20892064.5, Nov. 24, 2023, 12 pages.
Canadian Examination Report; Canadian Intellectual Property Office; Canadian Patent Application No. 3,159,878; Jul. 13, 2023; 4 pages.
Australian Examination Report; IP Australia; Australia Patent Application No. 2020391236; Jul. 24, 2023; 3 pages.
Canadian Examination Report; Canadian Intellectual Property Office; Canadian Patent Application No. 3,159,878; Apr. 2, 2024; 4 pages.
International Search Report; International Searching Authority; International Patent Application No. PCT/US2018/029781; Jul. 13, 2018; 3 pages.
Written Opinion; International Searching Authority; International Patent Application No. PCT/US2018/029781; Jul. 13, 2018; 7 pages.
Car thefts up 49% in five years following advent of keyless-entry technology; The Sunday Times Driving; retrieved on Jan. 13, 2021; https://www.driving.co.uk/news/many-cars-sale-today-risk-keyless-theft-new-research-finds/; 6 bages.
International Search Report; International Searching Authority; International Application No. PCT/US2020/062479; Mar. 11, 2021; 2 pages.
Written Opinion of the International Searching Authority; International Searching Authority; International Patent Application No. PCT/US2020/062479; Mar. 11, 2021; 7 pages.

* cited by examiner

ULTRA-WIDEBAND TECHNOLOGIES FOR SEAMLESS ACCESS CONTROL

CROSS-REFERENCE TO RELATED APPLICATIONS

This application is a continuation of U.S. patent application Ser. No. 17/105,737 filed Nov. 27, 2020 and issued as U.S. Pat. No. 11,663,864, which claims the benefit of U.S. Provisional Application No. 62/940,997 filed on Nov. 27, 2019, the contents of each application are incorporated herein by reference in their entirety.

BACKGROUND

Ultra-wideband (UWB) technologies are based on the IEEE 802.15.4 (wireless) standard, which is used to combine sensors and actuators into a single wireless network and can be used to determine the relative position of peer devices with a high degree of accuracy. For example, UWB can be used to determine the relative position of peer devices with a line of sight of up to two hundred meters. In contrast to narrow band wireless technologies, the wider bandwidth in UWB technologies provides very stable connectivity with little to no interference and offers high precision positioning, even in congested multi-path signal environments.

SUMMARY

One embodiment is a unique system, components, and methods for using ultra-wideband technologies for seamless access control. Other embodiments include apparatuses, systems, devices, hardware, methods, and combinations for using ultra-wideband technologies for seamless access control.

According to an embodiment, a method may include communicating, via a Bluetooth communication circuitry of a first computing device associated with an access control device that controls access to a passageway, with a second computing device over a Bluetooth communication connection established between the first computing device and the second computing device to determine that the second computing device includes ultra-wideband (UWB) communication circuitry for UWB-based communication, waking the UWB communication circuitry of the second computing device from a low power state in response to the Bluetooth communication, and determining, by the first computing device based on at least one UWB communication signal received from the second computing device, a location of the second computing device relative to the first computing device.

In some embodiments, the method may further include determining, by the first computing device, whether the location of the second computing device relative to the first computing device is a location that indicates an intent of a user of the second computing device to access the passageway.

In some embodiments, determining whether the location is a location that indicates an intent of a user of the second computing device to access the passageway may include determining an angle of arrival of the at least one UWB communication signal at a plurality of antennas of the first computing device.

In some embodiments, determining whether the location is a location that indicates an intent of a user of the second computing device to access the passageway may include determining a distance of the second computing device relative to the first computing device based on a time of flight of the at least one UWB communication signal from the second computing device to a plurality of antennas of the first computing device.

In some embodiments, communicating with the second computing device over the Bluetooth communication connection may further include receiving access credentials from the second computing device with respect to access to the access control device.

In some embodiments, the method may further include communicating, from the first computing device, an alert to the second computing device in response to determining that the second computing device is approaching an area that a user of the second computing device is unauthorized to access.

In some embodiments, the method may further include determining, by the first computing device, a duration of time for which the access control device is to retain open a barrier that secures the passageway based on the location of the second computing device.

In some embodiments, the method may further include modifying at least one environmental factor of a room secured by the access control device based on the location of the second computing device.

In some embodiments, the first computing device may include the access control device.

According to another embodiment, a system may include an access control device configured to control access to a passageway, a first computing device associated with the access control device, the first computing device comprising a first Bluetooth Low Energy (BLE) communication circuitry and a first ultra-wideband (UWB) communication circuitry, and a second computing device comprising a second BLE communication circuitry and a second UWB circuitry, wherein the first computing device is configured to communicate with the second computing device over a BLE communication connection established between the first computing device and the second computing device to determine that the second computing device is capable of UWB-based communication, wherein the second computing device is configured to wake the second UWB communication circuitry from a low power state in response to the BLE communication, and wherein the first computing device is further configured to determine a location of the second computing device relative to the first computing device based on at least one UWB communication signal received from the second computing device.

In some embodiments, the first computing device may be further configured to determine whether the location of the second computing device relative to the first computing device is a location that indicates an intent of a user of the second computing device to access the passageway.

In some embodiments, to determine whether the location is a location that indicates an intent of a user of the second computing device to access the passageway may include to determine an angle of arrival of the at least one UWB communication signal at a plurality of antennas of the first computing device.

In some embodiments, to determine whether the location is a location that indicates an intent of a user of the second computing device to access the passageway may include to determine a distance of the second computing device relative to the first computing device based on a time of flight of the at least one UWB communication signal from the second computing device to a plurality of antennas of the first computing device.

In some embodiments, to communicate with the second computing device over the BLE communication connection may further include to receive access credentials from the second computing device with respect to access to the access control device.

In some embodiments, the first computing device may be further configured to communicate an alert to the second computing device in response to a determination that the second computing device is approaching an area that a user of the second computing device is unauthorized to access.

In some embodiments, the first computing device may be further configured to determine a duration of time for which the access control device is to retain open a barrier that secures the passageway based on the location of the second computing device.

In some embodiments, the first computing device may include the access control device.

According to yet another embodiment, a first computing device may include a Bluetooth Low Energy (BLE) communication circuitry, an ultra-wideband (UWB) communication circuitry, a processor, and a memory comprising a plurality of instructions stored thereon that, in response to execution by the processor, causes the first computing device to communicate with a second computing device over a BLE communication connection established between the first computing device and the second computing device to determine that the second computing device is capable of UWB-based communication, and determine a location of the second computing device relative to the first computing device based on at least one UWB communication signal received from the second computing device in response to UWB communication circuitry of the second computing device being awaken based on the BLE communication with the first computing device.

In some embodiments, the plurality of instructions may further cause the first computing device to determine whether the location of the second computing device relative to the first computing device is a location that indicates an intent of a user of the second computing device to access a passageway controlled by an access control device associated with the first computing device.

In some embodiments, to determine whether the location is a location that indicates an intent of a user of the second computing device to access the passageway may include to determine an angle of arrival of the at least one UWB communication signal at a plurality of antennas of the first computing device, and determine a distance of the second computing device relative to the first computing device based on a time of flight of the at least one UWB communication signal from the second computing device to a plurality of antennas of the first computing device.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Figure 1:
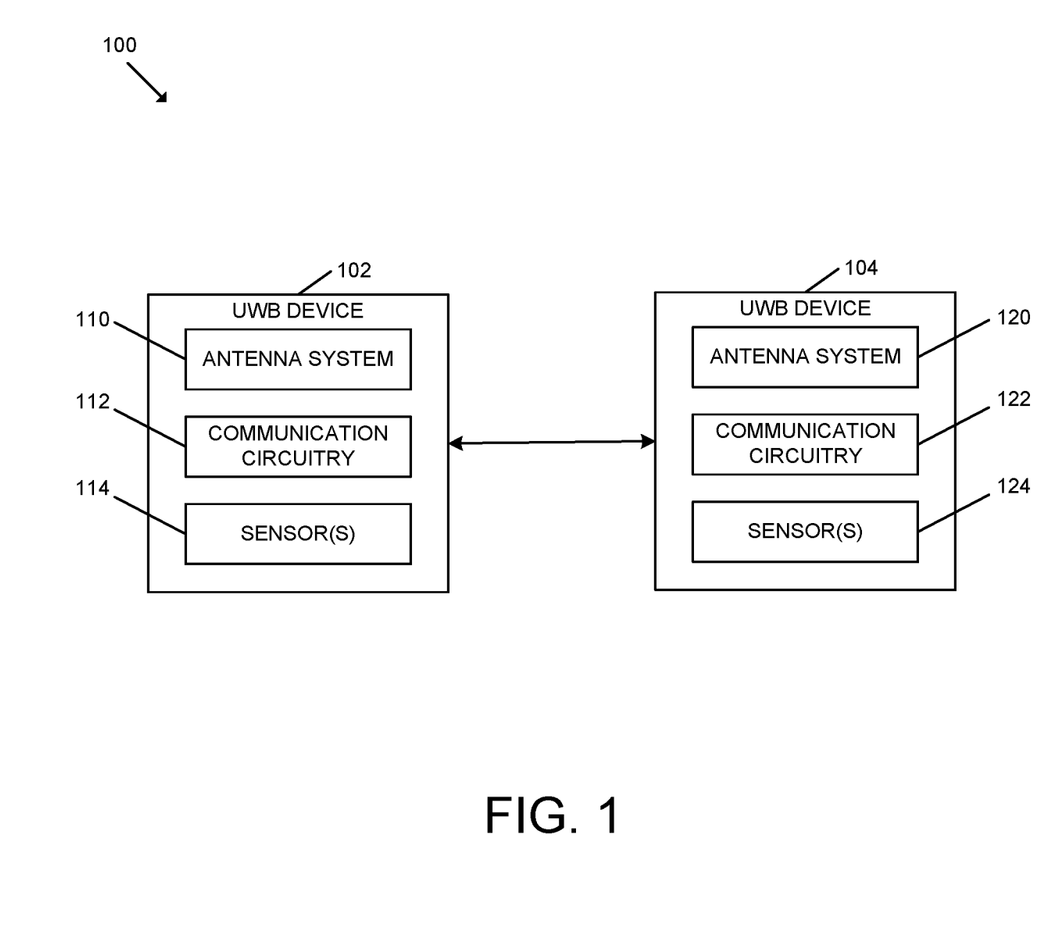
FIG. 1 is a simplified block diagram of at least one embodiment of using ultra-wideband technologies for seamless access control.

Referring now to FIG. 1, in the illustrative embodiment, a system 100 includes an ultra-wideband (UWB) device 102 and an ultra-wideband (UWB) device 104. As described in greater detail below, the UWB devices 102, 104 may be configured to communicate with one another via UWB-based communication and/or other communication protocols/techniques in order to enable various seamless access control features. It should be appreciated that UWB-enabled devices described herein (e.g., the UWB devices 102, 104) may be referred to as UWB devices/tags, and those devices/tags may take various form factors depending on the particular embodiment.

As shown in the illustrative embodiment of FIG. 1, the UWB device 102 includes an antenna system 110, communication circuitry 112, and one or more sensors 114. Similarly, the UWB device 104 includes an antenna system 120, communication circuitry 122, and one or more sensors 124. Although only two UWB devices 102, 104 are depicted in reference to FIG. 1, it should be appreciated that additional UWB devices may be included in the system 100 in other embodiments. It should be further appreciated that the UWB devices 102, 104 may communicate with other devices that are not UWB-enabled in some embodiments. In some embodiments, one or more of the UWB devices 102, 104 may omit the sensors 114, 124.

It should be appreciated that each of the UWB devices 102, 104 may be embodied as any type of device capable of communicating using UWB technology (e.g., using the IEEE 802.15.4 (wireless) standard) and otherwise suitable for performing the functions described herein. In some embodiments, one or more of the UWB devices 102, 104 may be embodied as an access control device, credential reader device, electronic lock, mobile device, accessory device, non-vehicular device, and/or other device capable of communicating using one or more UWB technologies. More specifically, in some embodiments in which a UWB device 102, 104 is embodied as an access control device, the access control device may be embodied as any type of device capable of controlling and/or facilitating access through a passageway (e.g., defined in a building). For example, in various embodiments, the access control device may be embodied as an electronic lock (e.g., a mortise lock, a cylindrical lock, or a tubular lock), an exit device (e.g., a pushbar or pushpad exit device), a door closer, an auto-operator, a motorized latch/bolt (e.g., for a sliding door), barrier control device (e.g., battery-powered), or a peripheral controller of a barrier to a passageway. Accordingly, in some embodiments, the access control device may include a lock mechanism configured to be positioned in a locked state in which access to the passageway is denied, or may be positioned in an unlocked state in which access to the passageway is permitted. In some embodiments, the lock mechanism includes a deadbolt, latch bolt, lever, and/or other mechanism adapted to move between the locked and unlocked state and otherwise perform the functions described herein. However, it should be appreciated that the lock mechanism may be embodied as any another mechanism suitable for controlling access through a passageway in other embodiments.

Depending on the particular embodiment, an access control device may include a credential reader or be electrically/communicatively coupled to a credential reader configured to communicate with active and/or passive credentials. For example, in some embodiments, one or more of the credentials may be embodied as a passive credential device having a credential identifier (e.g., a unique ID) stored therein and is "passive" in the sense that the credential device is configured to be powered by radio frequency (RF) signals received from a credential reader. In other words, such passive credentials do not have an independent power source but, instead, rely on power that is induced from RF signals transmitted from other devices in the vicinity of the credential. In particular, in some embodiments, one or more of the passive credentials may be embodied as a proximity card, which is configured to communicate over a low frequency carrier of nominally 125 kHz, and/or a smartcard, which is configured to communicate over a high frequency carrier frequency of nominally 13.56 MHz. However, it should be appreciated that, in other embodiments, one or more of the credentials may be embodied as a virtual credential (e.g., a Bluetooth transmitted credential) stored on the mobile device 106 and/or other computing device of a particular user. For example, the credential device may be "active" in the sense that the credential device has an independent power source (e.g., a rechargeable battery).

In some embodiments, the UWB device 102 may be embodied as the initiator for UWB-based communication, whereas in other embodiments, the UWB device 104 may be embodied as the initiator for UWB-based communication. Similarly, in some embodiments, the UWB device 104 may be embodied as the responder for UWB-based communication, whereas in other embodiments, the UWB device 102 may be embodied as the responder for UWB-based communication.

As indicated above, the illustrative UWB device 102 includes an antenna system 110 and communication circuitry 112. Additionally, in some embodiments, the UWB device 102 may include one or more sensors 114.

The antenna system 110 may include a plurality of antennas positioned apart from one another such that a signal is received by the various antennas at different points in time, thereby permitting the UWB device 102 to determine the angle of arrival (AoA) of the signal relative to the UWB device 102. Depending on the particular embodiment, the antennas of the antenna system 110 may be selected and/or positioned to permit a two-dimensional determination of the angle of arrival (e.g., using two or more antennas) or a three-dimensional determination of the angle of arrival (e.g., using three or more antennas). In other embodiments, the antenna system 110 may include only a single antenna and/or another number of antennas. For example, in embodiments in which the UWB device 102 serves at an initiator for UWB-based communication, the antenna system 110 may include at least two antennas, whereas in embodiments in which the UWB device 102 serves as a responder for UWB-based communication, the antenna system 110 may include one or more antennas. In various embodiments, the antennas may be embodied as chip antennas, patch antennas, whip antennas, trace antennas, and/or other suitable antennas. Further, in various embodiments, the antennas may be positioned on one or more planes in a PCB, and the antenna system 110 may be positioned in any location suitable for performing the functions described herein. For example, in embodiments in which the antenna system 110 is associated with an access control device, the antenna system 110 may be positioned on either side of a corresponding door/barrier, within the door/barrier, or within the frame/trim for the door/barrier. In particular, in some embodiments, the antenna system 110 may be secured to a wall adjacent the door/barrier.

The communication circuitry 112 of the UWB device 102 may be configured to use the antenna system 110 to communicate with other devices (e.g., the UWB device 104) via UWB-based communication. In some embodiments, the communication circuitry 112 may further enable one or more other communication technologies (e.g., wireless or wired communications) and associated protocols (e.g., Ethernet, Bluetooth (including Bluetooth Low Energy (BLE), Wi-Fi (e.g., infrastructure or ad hoc mode), Wi-Fi Direct, Zigbee, Near Field Communication (NFC), WiMAX, etc.) to effect communication with other devices depending on the particular embodiment (e.g., using the same or different antennas and/or antenna system 110).

In some embodiments, the UWB device 102 may include one or more sensors 114 configured to generate sensor data (e.g., by virtue of one or more signals), which may be interpreted by a processor of the UWB device 102 to determine one or more characteristics associated with the UWB device 102. For example, in various embodiments, the sensors 114 may detect various characteristics of the physical environment of the UWB device 102 (e.g., internal and/or external to the UWB device 102), electrical characteristics of the UWB device 102, electromagnetic characteristics of the UWB device 102 and/or its surroundings, and/or other suitable characteristics. In particular, the UWB device 102 may include a door position sensor configured to generate sensor data (e.g., by virtue of one or more signals) associated with a door position status, which may be interpreted by the UWB device 102 to determine whether the door is in a closed position or an open position (and/or a position therebetween), and/or a latchbolt sensor configured to generate sensor data (e.g., by virtue of one or more signals) associated with a latchbolt status, which may be interpreted by the UWB device 102 to determine whether the latchbolt is in an extended position or a retracted position. In various embodiments, additional and/or alternative sensors other than those described above may be included in the UWB device 102. For example, the sensors may include environmental sensors (e.g., temperature sensors, air pressure sensors, humidity sensors, light sensors, etc.), inertial sensors (e.g., accelerometers, gyroscopes, etc.), magnetometers, proximity sensors, optical sensors, electromagnetic sensors, audio sensors (e.g., microphones), motion sensors, cameras, piezoelectric sensors, pressure sensors, switches (e.g., reed switches), and/or other types of sensors.

It should be appreciated that the UWB device 104 may include components similar to the components of the UWB device 102 described above and, therefore, the descriptions of those components have not been repeated herein for clarity of the description. For example, in some embodiments, the antenna system 120 of the UWB device 104 may be similar to the antenna system 110 of the UWB device 102, the communication circuitry 122 of the UWB device 104 may be similar to the communication circuitry 112 of the UWB device 102, and/or the sensors 124 of the UWB device 102 may be similar to the sensors 114 of the UWB device 102. Further, it should be appreciated that the UWB device 102 and/or the UWB device 104 may include other components, sub-components, and/or devices commonly found in a computing device, which are not discussed herein for brevity of the description. Additionally, in some embodiments, one or more of the components of the UWB device 102 may be omitted from the UWB device 104 (e.g., the sensors 114).

It should be appreciated that each of the UWB device 102 and/or the UWB device 104 may be embodied as one or more computing devices similar to the computing device 200 described below in reference to FIG. 2. For example, one or more of the UWB devices 102, 104 may include a processing device 202 and a memory 206 having stored thereon operating logic 208 for execution by the processing device 202 for operation of the corresponding device.

Figure 2:
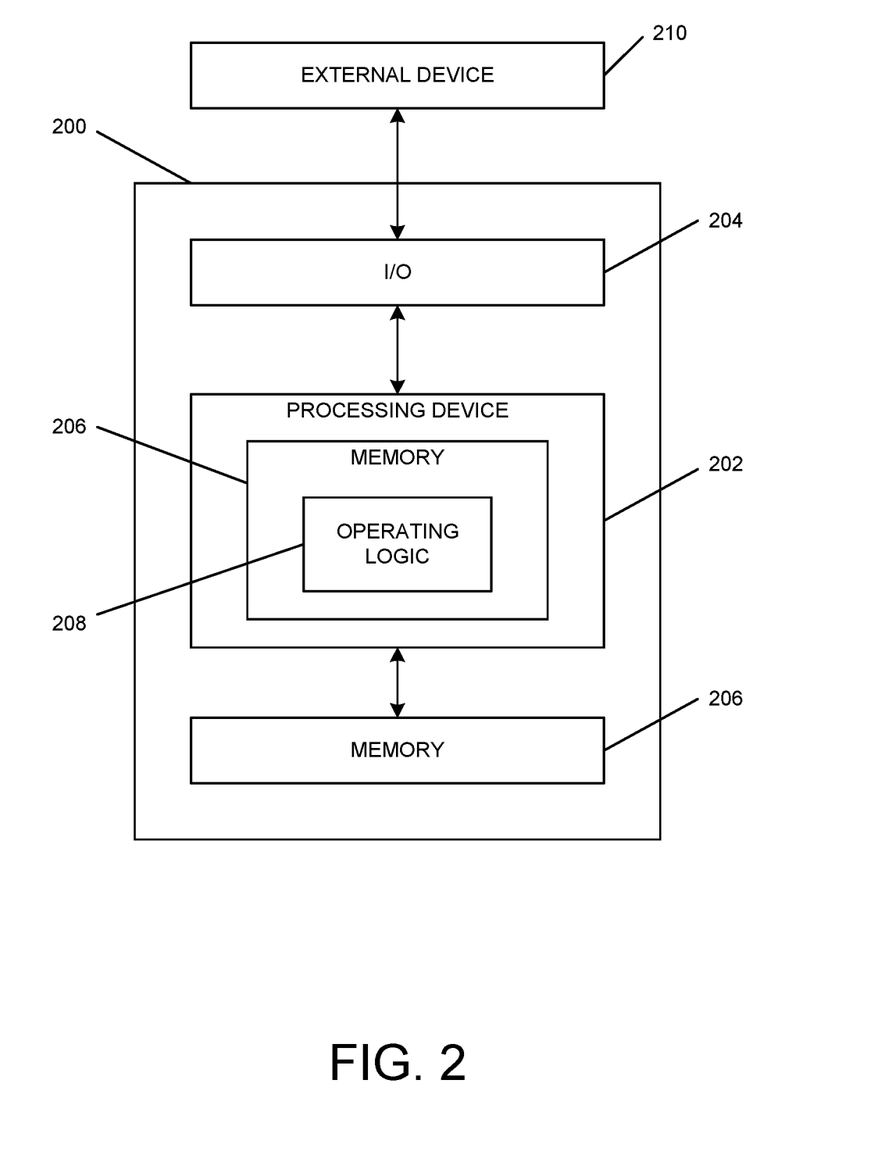
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of a UWB device 102, 104 illustrated in FIG. 1. Depending on the particular embodiment, computing device 200 may be embodied as a UWB-enabled device, reader device, access control device, accessory device, server, desktop computer, laptop computer, tablet computer, notebook, netbook, Ultrabook™, mobile computing device, cellular phone, smartphone, wearable computing device, personal digital assistant, Internet of Things (IoT) device, monitoring device, camera device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the UWB device 102 and/or the UWB device 104. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

As indicated above, it should be appreciated that the system 100 leverages the UWB devices 102, 104 to implement various seamless access control features. In doing so, it should be appreciated that UWB utilizes multiple antennas (e.g., of the antenna system(s) 110, 120) to calculate angle of arrival (AoA) of an incoming signal, which provides the direction from which a signal is coming. Although Bluetooth technologies are also capable of similar calculations, the system 100 leverages UWB to provide improved distance calculations relative to Bluetooth. More specifically, Bluetooth uses the signal strength of a signal (e.g., via RSSI) to estimate the distance of a computing device from which a signal was transmitted; however, signal strength is susceptible to various types of errors due to the types of materials through which a signal travels, RF reflections, and/or factors. On the other hand, UWB relies on time of flight (ToF) calculations of a signal to determine an accurate distance on the radial (e.g., to within 10 cm). Because the pulses of data in the UWB protocols occur so quickly, UWB does not suffer from the RF reflection errors that limit Bluetooth protocols. In essence, the signal is already processed when using UWB before an RF reflection has an opportunity to become an error factor with UWB communication.

It should be appreciated that the system 100 may be used to provide various mechanisms for improved building intelligence. For example, in some embodiments, instead of defaulting to a "locked" status, the access control devices securing doors in a building may default to an "unlocked" status and, in conjunction with monitoring of various UWB tags/devices by the system 100, those access control devices may change to a "locked" status depending on which persons are in the vicinity. For example, an access control device may communicate with UWB tags/devices as they approach or are otherwise nearby the access control device and, as long as only users associated with those UWB tags/device are within a certain region relative the access control device (e.g., within a threshold distance, within a threshold angle, on a particular side, and/or otherwise), the access control device may remain in a locked state. However, if an unauthorized user or UWB tag/device comes within the region (e.g., within the threshold distance, within the threshold angle, on the particular side, and/or otherwise), the access control device may transition to a locked state (e.g., before such user has an opportunity to pass through a passageway controlled/secured by the access control device). In some embodiments, once no unauthorized users or UWB tags/devices remain within such region, the access control device may transition back to the default unlocked state so as to provide seamless access to authorized users.

In some embodiments, various devices in a commercial facility, office facility, industrial facility, and/or other suitable facility may be "tagged" with a UWB device, which may be leveraged to determine the position of those tagged devices with a high level of accuracy. As such, the UWB devices and protocols may be leveraged to ensure that various devices are returned to their proper locations. For example, a "digital signature" may be used for office asset tracking. Further, in some embodiments, the accuracy associated with UWB device microlocation can be leveraged for personalized environments. For example, a UWB-enabled mobile device or tag of a user may be tracked to determine that a particular person is within a room (e.g., an office) rather than simply ascertaining the lock mechanism for that room has been unlocked. Based on the presence, or lack thereof, of a particular user, the system 100 may modify the lighting, temperature, and/or other environmental factors of the room to provide a UWB-enabled personalized environment for the user.

In some embodiments, the system 100 may utilize UWB for various types of "people counting" and people tracking. For example, in an emergency situation, the system 100 may determine the number of people in the building just prior to the emergency alert and how many people are remaining at any given point during the emergency (e.g., via UWB-enabled tags/phones). Further, the system 100 may couple UWB-based location tracking with video monitoring in a building to monitor and detect user tailgating (i.e., a user following an authorized user into a building without having provided his/her own credentials for access). In another embodiment, UWB-based location tracking of people may allow an access control device to remain unlocked with free ingress/egress while detecting the user's credential as they pass through. Such a system may also be used in conjunction with video monitoring, for example, in order to capture images of unauthorized users passing through the secure passageway. Additionally, in some embodiments, the identification of a person's location within a building (e.g., in 3D) may be used in conjunction with an interface (e.g., a smartphone application) to direct a person to the nearest exist (e.g., in the case of a fire or other emergency).

In some embodiments, the system 100 may utilize UWB to perform direction monitoring of UWB-enabled devices (e.g., the UWB devices 102, 104). For example, in certain circumstances (e.g., a retirement facility, restricted healthcare facility, etc.), a reader, access control device, and/or other UWB device may be positioned near an entryway of a building and the residents/users may be tagged (e.g., via respective mobile devices). If a particular UWB tag/device is walking toward the entryway without authorization to leave, the corresponding access control device may lock/secure the door to prevent exit. Further, in some circumstances, the system 100 may allow a UWB tag/device to leave a building but track the departure (and/or entry) of such devices in order to gain an understanding of which people are coming/going to/from the building. Further, UWB location tracking may also enable detailed arrival monitoring. For example, when a child arrives at home, rather than simply getting an indication that the door has been unlocked, the system 100 may determine that the child has unlocked the door and entered the residence.

In some embodiments, the system 100 may utilize UWB for enhanced zone control. For example, every relevant person (e.g., every employee) may have a UWB tag/badge/device that generates an alert when that person enters (or approaches) an area that the person is unauthorized to access. For example, on the shop floor of a facility, there may be restricted areas due to safety concerns, so somebody may get an alert if they are entering or approaching an unauthorized area. Further, in some embodiments, the person may be alerted even if authorized in order to ensure the person is optimally aware of his/her surroundings in the unsafe area. As indicated above, enhanced zone control may be further accomplished by dynamically changing access control restrictions as a user/visitor enters various areas.

Further, the movement of people and/or goods may be monitored to ensure that they go through the right steps at the right time, which can reduce human error (e.g., accidentally skipping a step in a sequence). As another example, a door lock (e.g., an office door lock or conference room door lock) may unlock when the person comes within a certain range (e.g., a predefined range) of the door and the person is authorized to access the room for use (e.g., by reserving the room).

In some embodiments, the system 100 may include a kiosk that tracks users (e.g., via login) during defined times. Depending on the circumstances, the users may be tracked at different times, at different rates, and/or according to different criteria. For example, full-time employees may be tracked differently than visitors, and/or the ping rate may be increased during certain events (e.g., emergencies) to change the frequency at which user locations are updated. In some embodiments, visitors may use their UWB phone/tag/device to permit tracking, for example, by accepting location monitoring via an agreement (e.g., by tapping a kiosk or otherwise launching an authorization application). It should be appreciated that "tap to track" techniques may be employed (e.g., via temporary authorization) in various public and/private locations (e.g., children's museums, zoos, public facilities, etc.).

It should be appreciated that the UWB device 102 may be used in conjunction with a bay door, for example, to open and/or close bay doors automatically and in a seamless manner based on the location of an authorized user. Further, in some embodiments, the system 100 may leverage UWB in order to determine and alert various users of the existence of something (e.g., a piece of moving or stationary equipment) on the opposing side of the bay door. In some embodiments, the UWB device 102 may be used in conjunction with other types of openings and barriers including, for example, garage doors. Further, in some embodiments, a UWB tag may be placed on a pet's collar such that a pet door may be locked when the pet is not within the immediate vicinity of the pet door.

As indicated above, in some embodiments, the UWB technology may be used in conjunction with other technologies. For example, UWB communication has a relatively higher power draw than Bluetooth communication, which affects battery-powered devices. As such, in some embodiments, the UWB device 102 may utilize BLE, for example, as a first order communication technology (e.g., to determine that the device 102 is within proximity of another UWB-enabled device) before awaking the UWB circuitry from a low power state (e.g., a sleep state). Further, in some embodiments, the BLE technology may also be used to transmit access credentials such that the UWB technology is limited to location tracking. Additionally, UWB may be used as part of a larger intent algorithm (e.g., multifactor intent calculation and/or multifactor authentication) in which rate/direction of approach, angle, and/or other characteristics may be considered. One of the multifactor authentication technologies may include voice recognition. It should be appreciated that the system 100 may utilize geofencing, GPS, Wi-Fi, and/or other technologies in conjunction with UWB in other embodiments.

In some embodiments, it should be appreciated that the UWB device 102 and/or other device that is determining the location of other devices may not be stationary and, therefore, the location and/or orientation of that device may be determined. For example, if the UWB device 102 is an electronic lock mounted to a door, the UWB device 102 may determine whether the door is open or closed in order to provide accurate meaning to angle of arrival calculations of the UWB device 102. As such, in some embodiments, the UWB device 102 may determine the relative angle of the electronic lock relative to a reference position (e.g., closed) based on sensor data generated by one or more sensors 114 (e.g., magnetometer, gyroscope, etc.). In other embodiments, the UWB device 102 may be positioned on the door frame such that UWB can be leveraged to determine the door position.

Depending on the particular embodiment, various other data may be exchanged (e.g., via UWB and/or other communication technologies). For example, in some embodiments, device firmware, commissioning data, audit data, and/or other suitable data may be exchanged via UWB communication. In some embodiments, somebody's mobile device may be tied into the guest network when they arrive at a location (e.g., via a transmitted Wi-Fi credential) and/or the Wi-Fi circuitry may be "forced on" in response to exchange of such credentials. In other embodiments, an identification may be transferred via UWB to avoid creating a new account for a particular system. In some embodiments, the system 100 may utilize UWB to gather data regarding people passing through gates and/or other waypoints at an event. In yet other embodiments, UWB may be leveraged to track the way a person is moving and generate a unique signature associated with that person's movement. Further, machine learning and tracking techniques may subsequently be used to identify that person based on the person's unique movement signature.

In some embodiments, an auto-operator may leverage UWB tags/badges in order to determine the amount of time to keep a barrier open. For example, rather than having a timed opening, the auto-operator may track the location of the person passing through the corresponding barrier and close the barrier only after and/or immediately after the person has safely passed through the passageway. In doing so, the auto-operator may ensure regulatory compliance (e.g., ADA compliance) while simultaneously conserve energy (e.g., by limiting the amount of air that passes through the barrier while open).

In some embodiments, the UWB device 102 may be used in order to improve school safety. For example, in some embodiments, a system 100 may be employed in order to ensure that a student cannot lock a classroom door without an authorized person (e.g., a teacher) whom bears a UWB device being in the classroom. Further, in some embodiments, UWB location monitoring and direction monitoring may be used in conjunction with school buses to ensure the location of all students within and around a school bus are known. Additionally, as indicated above, the number of persons within the school and direction of travel of students within and/or outside of the school may be ascertained in emergency situations.

In some embodiments, multiple UWB devices 102 may be used in the system 100 in order to establish a crowd-sourced network for precise location identification. For example, rather than a simple indication that a UWB device/tag has been identified within a particular radius (e.g., within a "bubble"), the system 100 may indicate the precise location (e.g., via direction/distance relative to the identifying device). Accordingly, in some embodiments, an interior building "GPS" may be established using the network of UWB devices. In some embodiments, dead reckoning, AI driven auto/dynamic access adjusting, and/or other features may be implemented. Further, in some embodiments, the system 100 may establish a "door viewer" application. In some embodiments, UWB may be used for baggage handling/tracking.

What is claimed is:

1. A method, comprising:
   communicating, via a Bluetooth communication circuitry of a first computing device associated with an access control device that controls access to a passageway, with a second computing device over a Bluetooth communication connection established between the first computing device and the second computing device to determine that the second computing device includes ultra-wideband (UWB) communication circuitry for UWB-based communication;
   waking the UWB communication circuitry of the second computing device from a low power state in response to the Bluetooth communication;
   determining, by the first computing device based on at least one UWB communication signal received from the second computing device, a location of the second computing device relative to the first computing device;
   determining a location of the second computing device within a building based on the location of the second computing device relative to the first computing device; and
   directing, via an interface of the second computing device, a user of the second computing device to an exit of the building based on the location of the second computing device within the building.

2. The method of claim 1, wherein communicating with the second computing device over the Bluetooth communication connection further comprises receiving access credentials from the second computing device with respect to access to the access control device.

3. The method of claim 2, further comprising communicating, from the first computing device, an alert to the second computing device in response to determining that the second computing device is approaching an area that a user of the second computing device is unauthorized to access.

4. The method of claim 1, wherein the first computing device comprises the access control device.

5. A system, comprising:
   an access control device configured to control access to a passageway;
   a first computing device associated with the access control device, the first computing device comprising a first Bluetooth Low Energy (BLE) communication circuitry and a first ultra-wideband (UWB) communication circuitry; and
   a second computing device comprising a second BLE communication circuitry and a second UWB circuitry;
   wherein the first computing device is configured to communicate with the second computing device over a BLE communication connection established between the first computing device and the second computing device to determine that the second computing device is capable of UWB-based communication;
   wherein the second computing device is configured to wake the second UWB communication circuitry from a low power state in response to the BLE communication;
   wherein the first computing device is further configured to determine a location of the second computing device relative to the first computing device based on at least one UWB communication signal received from the second computing device;

wherein the first computing device is further configured to determine a location of the second computing device within a building based on the location of the second computing device relative to the first computing device; and wherein the first computing device is further configured to direct a user of the second computing device, via an interface of the second computing device, to an exit of the building based on the location of the second computing device within the building.

6. The system of claim 5, wherein to communicate with the second computing device over the BLE communication connection further comprises to receive access credentials from the second computing device with respect to access to the access control device.

7. The system of claim 5, wherein the first computing device comprises the access control device.

8. A first computing device, comprising:
a Bluetooth Low Energy (BLE) communication circuitry;
an ultra-wideband (UWB) communication circuitry;
a processor; and
a memory comprising a plurality of instructions stored thereon that, in response to execution by the processor, causes the first computing device to:
communicate with a second computing device over a BLE communication connection established between the first computing device and the second computing device to determine that the second computing device is capable of UWB-based communication;
determine a location of the second computing device relative to the first computing device based on at least one UWB communication signal received from the second computing device in response to UWB communication circuitry of the second computing device being awaken based on the BLE communication with the first computing device;
determine a location of the second computing device within a building based on the location of the second computing device relative to the first computing device; and
direct a user of the second computing device, via an interface of the second computing device, to an exit of the building based on the location of the second computing device within the building.

9. The method of claim 1, wherein determining the location of the second computing device within the building comprises determining a three-dimensional location of the second computing device within the building.

10. The method of claim 1, wherein directing the user of the second computing device to the exit of the building comprises directing the user of the second computing device to a nearest exit of the building based on the location of the second computing device within the building.

11. The method of claim 10, wherein directing the user of the second computing device to the nearest exit of the building comprises directing the user of the second computing device to the nearest exit of the building in response to determining that an emergency situation exists.

12. The method of claim 1, further comprising:
determining a count of a plurality of mobile computing devices within the building prior to an emergency alert indicative of an emergency situation, wherein the plurality of mobile computing devices comprises the second computing device; and
tracking the count of the plurality of mobile computing devices remaining within the building during the emergency situation.

13. The method of claim 1, further comprising monitoring a respective location within the building of each mobile computing device of a plurality of mobile computing devices within the building in response to determining that an emergency situation exists, wherein the plurality of mobile computing devices comprises the second computing device.

14. The method of claim 13, further comprising unlocking a lock mechanism of the access control device during the emergency situation.

15. The system of claim 5, wherein to determine the location of the second computing device within the building comprises to determine a three-dimensional location of the second computing device within the building.

16. The system of claim 5, wherein to direct the user of the second computing device to the exit of the building comprises to direct the user of the second computing device to a nearest exit of the building based on the location of the second computing device within the building.

17. The system of claim 16, wherein to direct the user of the second computing device to the nearest exit of the building comprises to direct the user of the second computing device to the nearest exit of the building in response to a determination that an emergency situation exists.

18. The system of claim 5, wherein the first computing device is further configured to:
determine a count of a plurality of mobile computing devices within the building prior to an emergency alert indicative of an emergency situation, wherein the plurality of mobile computing devices comprises the second computing device; and
track the count of the plurality of mobile computing devices remaining within the building during the emergency situation.

19. The system of claim 5, wherein the first computing device is further configured to monitor a respective location within the building of each mobile computing device of a plurality of mobile computing devices within the building in response to a determination that an emergency situation exists, wherein the plurality of mobile computing devices comprises the second computing device.

20. The system of claim 19, wherein the access control device is configured to unlock a lock mechanism of the access control device during the emergency situation.

* * * * *